United States Patent
Hauser

(10) Patent No.: US 7,207,138 B1
(45) Date of Patent: Apr. 24, 2007

(54) GRAVITY FEED IRRIGATION APPARATUS

(76) Inventor: James R. Hauser, 430 Lacosta La., Johnstown, CO (US) 80534

( * ) Notice: Subject to any disclaimer, the term of this patent is extended or adjusted under 35 U.S.C. 154(b) by 0 days.

(21) Appl. No.: 11/473,208

(22) Filed: Jun. 22, 2006

Related U.S. Application Data

(63) Continuation of application No. 10/964,363, filed on Oct. 13, 2004, now abandoned.

(51) Int. Cl.
*A47G 7/02* (2006.01)
*A01G 27/00* (2006.01)
(52) U.S. Cl. ............................................. 47/40.5; 47/79
(58) Field of Classification Search ................. 47/48.5, 47/40.5, 79, 82, 67
See application file for complete search history.

(56) References Cited

U.S. PATENT DOCUMENTS

| | | | | |
|---|---|---|---|---|
| 3,542,069 A | * | 11/1970 | Ollison | 137/624.21 |
| 4,060,934 A | * | 12/1977 | Skaggs | 47/79 |
| D278,266 S | * | 4/1985 | Koper | D21/661 |
| 4,825,587 A | * | 5/1989 | Stancil | 47/40.5 |
| 5,157,868 A | * | 10/1992 | Munoz | 47/40.5 |
| 5,212,905 A | | 5/1993 | Philoctete | |
| 5,493,811 A | | 2/1996 | Tobias et al. | |
| 5,513,677 A | * | 5/1996 | McCurry | 141/1 |
| 5,779,215 A | * | 7/1998 | DeMasi | 248/523 |
| 5,799,437 A | * | 9/1998 | Evans et al. | 47/40.5 |
| 6,367,197 B1 | | 4/2002 | Saye | |
| 6,497,071 B1 | * | 12/2002 | Main et al. | 47/40.5 |
| 2002/0148158 A1 | | 10/2002 | Anderson | |
| 2003/0177695 A1 | | 9/2003 | Manning | |

* cited by examiner

*Primary Examiner*—T. Nguyen
(74) *Attorney, Agent, or Firm*—G. Brian Pingel; Camille L. Urban

(57) ABSTRACT

A gravity feed irrigation apparatus for supplying a flow of water at a controlled rate to a plant and having a lightweight shell-type enclosure that serves as a cover for a water reservoir attached to a water inlet in the cover. The reservoir is in the form of a watertight bladder that is in fluid communication with a flexible tube having a regulator for controlling the rate of water flow from the reservoir through the tube.

10 Claims, 4 Drawing Sheets

GRAVITY FEED IRRIGATION APPARATUS

This is a continuation application of application Ser. No. 10/964,363, filed Oct. 13, 2004 now abandoned and this application is hereby incorporated by reference.

BACKGROUND OF THE INVENTION

1. Field of the Invention

The present invention relates in general to an irrigation apparatus that can provide a continuous flow of water at a controlled rate to a plant, and more specifically resides in such apparatus that depends upon the force of gravity for its operation.

2. Description of the Prior Art

It is common in the industry for tree and shrub nurseries to utilize irrigation systems for supplying a continuous feed of water to their plants at a controlled rate to encourage the health and growth of the plants. Typically, such systems are pressurized so that large numbers of plants can be serviced by a single system.

To avoid the complexities of pressurized water supply systems utilized by nurseries, a wide variety of less complicated irrigation devices that depend upon the force of gravity for their operation have been developed. For example, See U.S. Pat. Nos. 6,367,197 B1; 5,493,811; 5,212,905 and U.S. Published Application Nos. 2002/0148158 A1 and 2003/0177695 A1.

Although the specific irrigation devices disclosed in such patents and applications appear to provide different alternatives for supplying water to plants at a controlled rate, none of inventions disclosed therein are adapted to have a design of an ornamental appearance that would be aesthetically pleasing for use in landscaped yards or fields. The present invention is adapted to provide an efficient, lightweight and relatively inexpensive gravity feed irrigation apparatus that has an attractive ornamental appearance that can be used to improve the landscape of one's property.

SUMMARY OF THE INVENTION

The present invention provides a gravity feed irrigation apparatus for supplying a flow of water at a controlled rate to a plant and includes a lightweight shell-type enclosure that serves as a cover for a water reservoir attached to a water inlet in the cover. Preferably, the water reservoir is in the form of a water-type bladder that holds a relatively large volume of water and is in fluid communication with a flexible tube having a water flow regulator for controlling the rate of flow of water from said bladder through said tubing.

The shell-type enclosure preferably has an exterior that is of an ornamental shape and has a generally open bottom. The apparatus further includes a support platform on which the shell-type enclosure is positioned to close off the open bottom. The support platform includes at least one aperture through which a retaining member can be directed to fasten the platform to a surface on which it rests.

Preferably, the platform has an upstanding flange that generally conforms to the shape of the open bottom of said shell-type enclosure to serve as a retaining means to prevent the enclosure from sliding off the support platform. Also, the shell-type enclosures are formed in a shape such that a major portion of one enclosure can fit into another of the enclosures so that the enclosures of two or more of said irrigation apparatuses can be nested together to facilitate their storage or transportation.

The foregoing and other advantages of the present invention will appear from the following description. In the description, reference is made to the accompanying drawings, which form a part hereof, and which there is shown by illustration and not of limitation a specific form in which the invention may be embodied. Such embodiment does not represent the full scope of the invention, but rather the invention may be employed in a variety of other embodiments and reference is made to the claims herein for interpreting the breadth of the invention.

DETAILED DESCRIPTION OF THE PREFERRED EMBODIMENT

Figure 1:
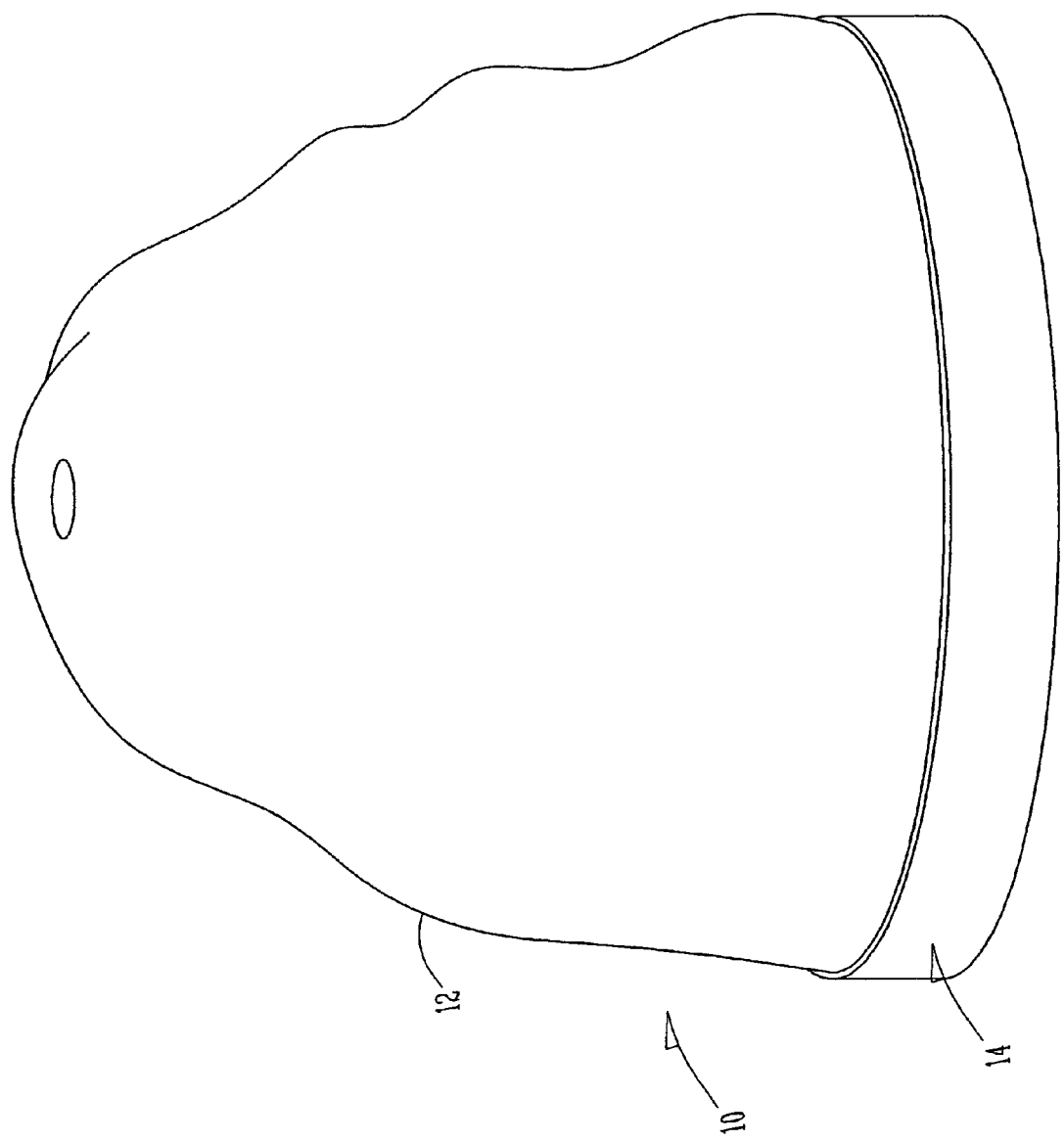
FIG. 1 is a front perspective of a preferred embodiment of a gravity feed irrigation apparatus of the present invention.

Referring now to the drawings, and with reference first to FIG. 1, a preferred embodiment of the gravity feed irrigation apparatus of the present invention is shown at 10 and is designed as a low cost, simplistic and efficient means for providing water to a variety of plants at a controlled rate for an extended duration.

The irrigation apparatus 10 is preferably designed with an ornamental appearance such as a rock configuration so that it can be utilized for landscaping lawns. The apparatus preferably includes a shell-type enclosure 12 and a support platform 14 upon which the enclosure 12 is positioned. Thus, the apparatus 10 can conveniently be utilized as part of the landscaping surrounding an office or residence without having a negative affect on the area in which it is located.

Figure 2:
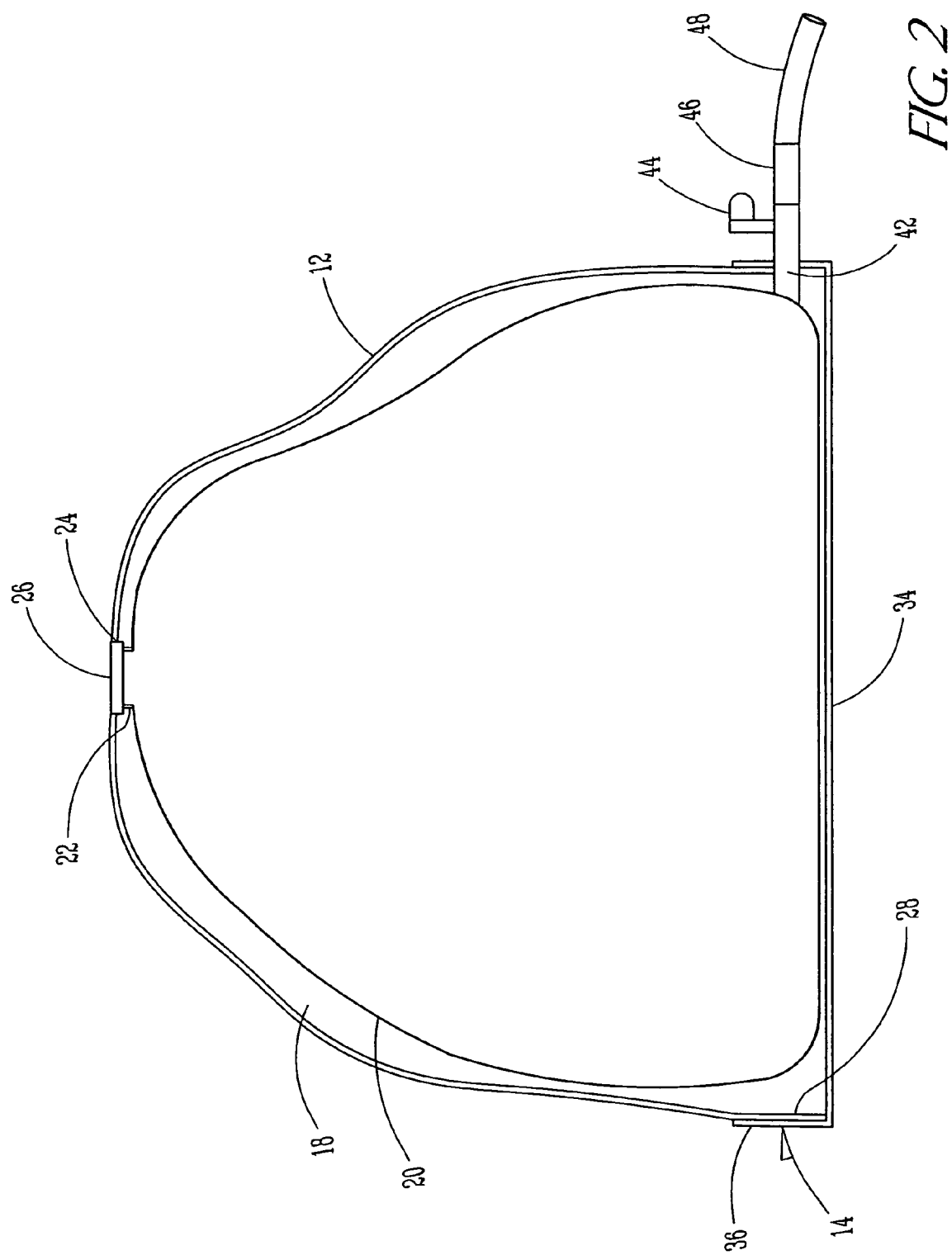
FIG. 2 is a cross-sectional view of the embodiment of FIG. 1 taken along a midpoint of such embodiment.

Referring now to FIG. 2, the enclosure 12 has a cross-section that is relatively empty to provide a large interior cavity 18 in which preferably a rubberized, watertight inflatable bladder 20 is disposed. The bladder 20 serves as a water reservoir for holding a relatively large volume of water and has a neck 22 that is attachable to a water inlet 24 in the enclosure 12. The water inlet 24 is preferably normally closed off by a small, flat cap 26 that is removable so that the bladder 20 can be filled with water when desired. Preferably, the enclosure 12 is bottomless. For purposes of this disclosure "bottomless" is defined as a generally open bottom—such as open bottom 28 shown in FIG. 2—that permits a number of the enclosures 12 to be nested within one another for purposes of storage or transportation.

Figure 3:
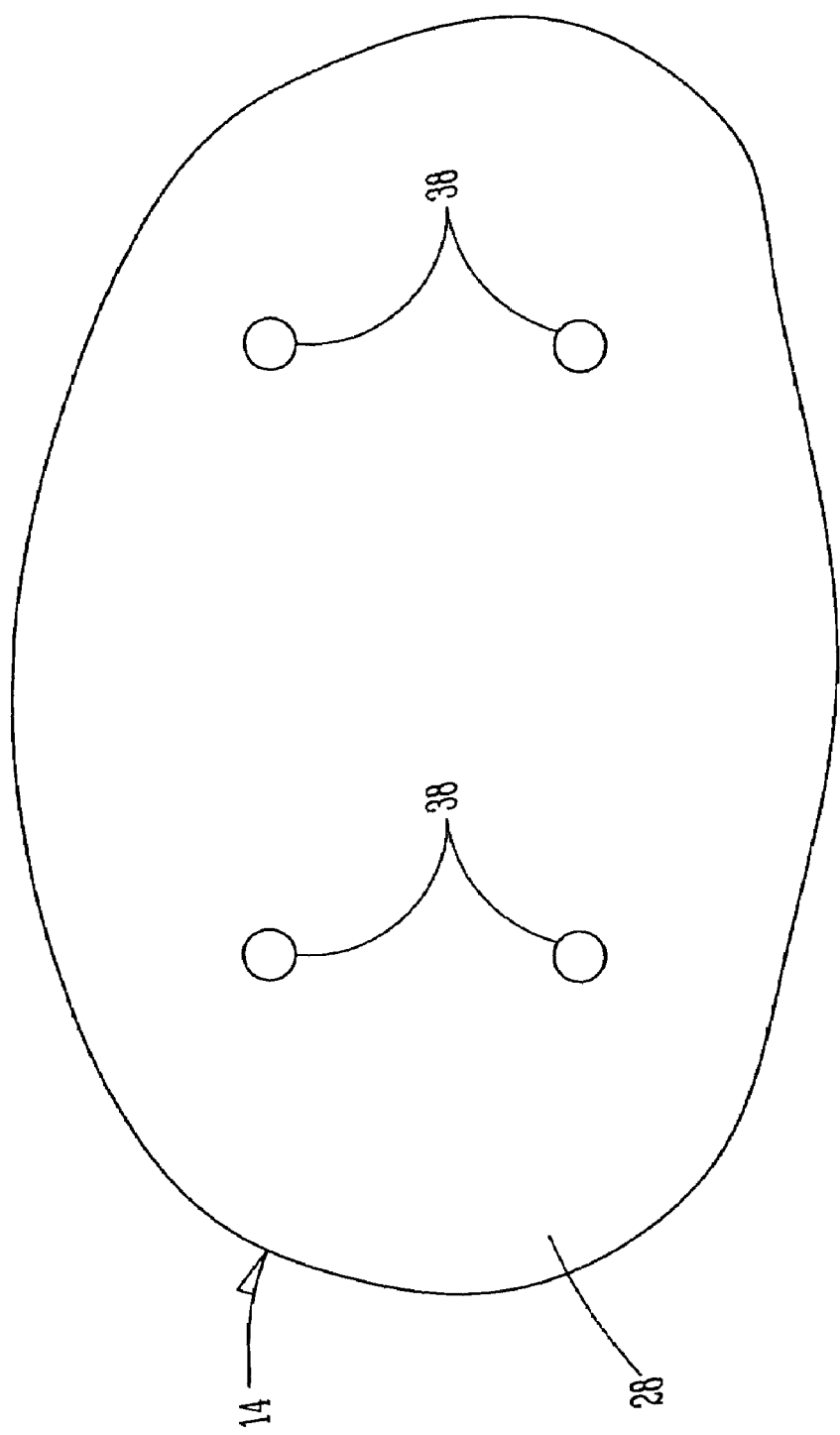
FIG. 3 is a bottom view of the embodiment of FIG. 1.

The platform 14 has a flat planer type surface 34 and an upstanding flange 36 that generally conforms to the shape of the open enclosure bottom 28 for receiving the enclosure 12 and maintaining it in position with respect to the platform 14. The platform 14, as shown only in FIG. 3, is formed with the bottom surface 34 preferably having a plurality of apertures 38 through which stakes, not shown, can be driven to semi-permanently secure the platform 14 into the soil on which the apparatus 10 is positioned.

Figure 4:
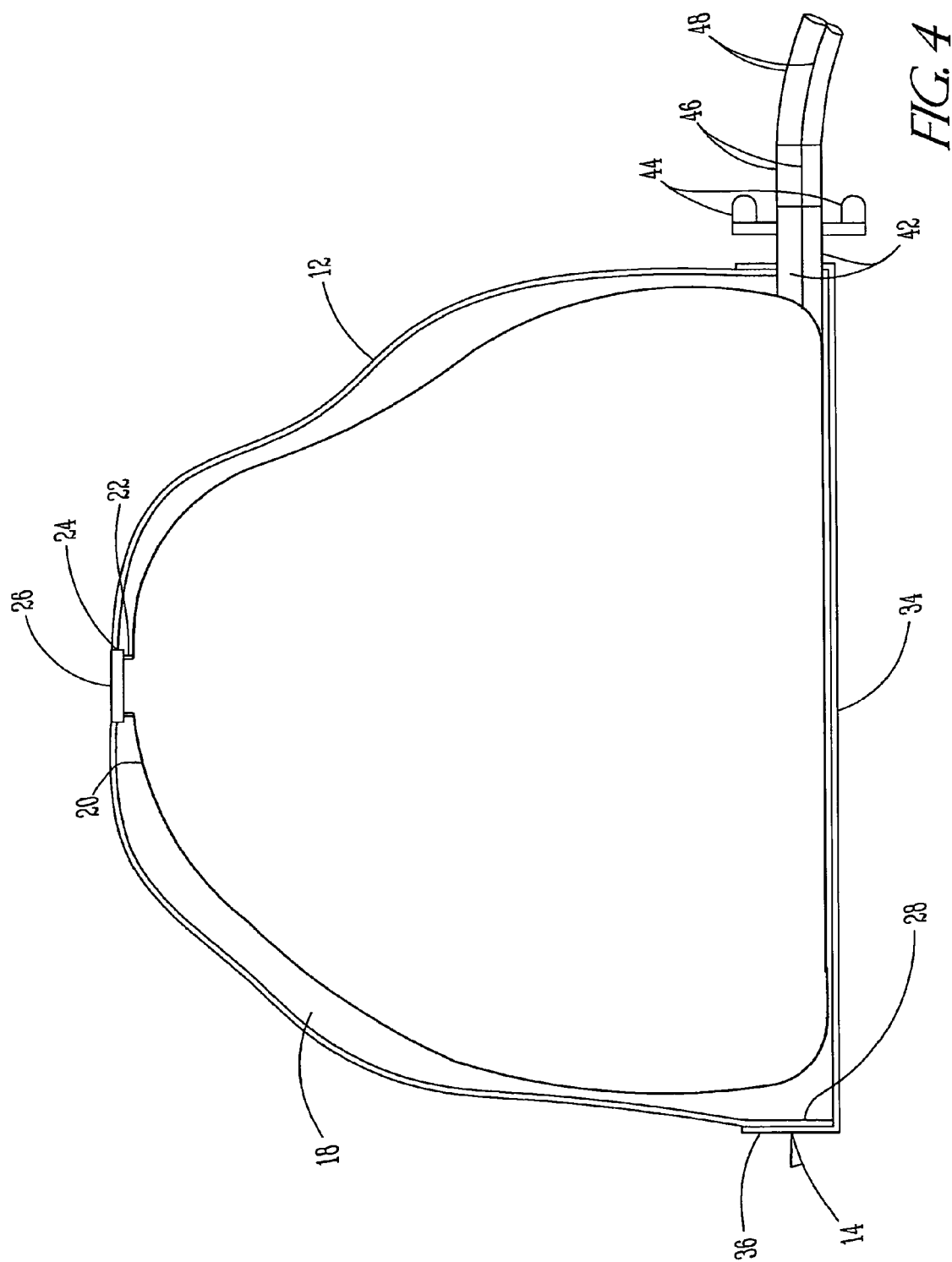
FIG. 4 is a cross-section view taken along the midpoint of an alternative embodiment of a gravity feed irrigation apparatus of the present invention.

The bladder 20 includes a bottom outlet 42 that can be opened or shut by an on/off valve 44. The outlet 42 preferably communicates with a splice valve 46, serving as a water flow regulator. The splice valve 46 has a narrowed interior, as is known in the art, to control the rate of flow from the bladder 20 into a flexible, plastic tubing 48, serving as a water conducting medium that carries the water to plants that are desired to be watered. Alternatively, in place of the splice valve 46, it would also be possible to utilize a variable flow valve so that a user can regulate the rate of flow from the bladder 20 as desired. It is also possible to use other types of fluid flow regulators to provide the type of regulation that would be optimum or to place the splice valve 46 toward the end of the tubing 48, which is preferable if more than one plant is being watered at a time. FIG. 4 shows multiple tubes 48 and splice valve 46 serving as the water conducting medium.

Thus, the present invention is adapted to be attractive but yet, provide an efficient and inexpensive means for supplying water to plants at a desired rate. Although the irrigation apparatus of the present invention has been described with respect to a preferred embodiment, it should be understood that the terminology and structure that has been described herein is intended to be in the nature of words of description rather than of limitation. Many modifications and variations of the present invention are possible in light of the above teachings. Accordingly, the scope of the present invention shall not be limited by such description, but is controlled by the language of the following claims.

What is claimed is:

1. A gravity feed irrigation apparatus for providing a flow of water at a controlled rate to a plant for an extended duration, said apparatus comprising:
   (a) a shell-type enclosure having a periphery having a water inlet;
   (b) a closed watertight container having an opening with a neck wherein said neck is directly connected to said water inlet and in fluid communication with said water inlet to serve as a reservoir for said water, said container is located within said shell-type enclosure
   (c) a cap connected to both said water inlet and said neck for completely closing off said shell-type enclosure and said container;
   (d) a water conducting medium connected to said container and in fluid communication with said container for delivering water to said plant; and
   (e) a water flow regulator connected to said water conducting medium and is located outside said shell-type enclosure for controlling the rate of flow of water from said container to said plant.

2. The irrigation apparatus as described in claim 1, wherein said shell-type enclosure has an exterior with an ornamental shape.

3. The irrigation apparatus as described in claim 1, wherein said shell-type enclosure is lightweight and bottomless.

4. The irrigation apparatus of claim 3, wherein said apparatus includes a bottom platform on which said shell-type enclosure is directly supported.

5. The irrigation apparatus as described in claim 3, wherein a platform has at least one aperture through which a retaining member can be directed to fasten said platform to a surface on which it rests.

6. The irrigation apparatus as described in claim 5, wherein said platform has an upstanding flange that generally conforms to the shape of said bottomless shell-type enclosure.

7. A gravity feed irrigation apparatus for providing a flow of water at a controlled rate to a plant for an extended duration, said apparatus comprising:
   (a) a shell-type enclosure having a periphery with a water inlet and an ornamental shape mimicking natural rock;
   (b) a closed watertight container having an opening with a neck wherein said neck is directly connected to said water inlet and in fluid communication with said water inlet to serve as a reservoir for said water, said container is located within said shell-type enclosure; (c) a cap connected to both said water inlet and said neck for completely closing off said shell-type enclosure and said container;
   (d) a water conducting medium connected to said container and in fluid communication with said container to provide water to said plant;
   (e) a water flow regulator connected to said water conducting medium and is located outside said shell-type enclosure for controlling the rate of flow of water from said container to said plant; and
   (f) said closed watertight container is in the form of an inflatable bladder.

8. The irrigation apparatus as described in claim 7, wherein said water flow regulator is associated with said water conducting medium.

9. The irrigation apparatus as described in claim 8, wherein said water conducting medium is formed with at least one flexible tube.

10. The irrigation apparatus as described in claim 8, wherein said water conducting medium is formed with a plurality of flexible tubes, each having a water flow regulator.

* * * * *